Patented Dec. 19, 1944

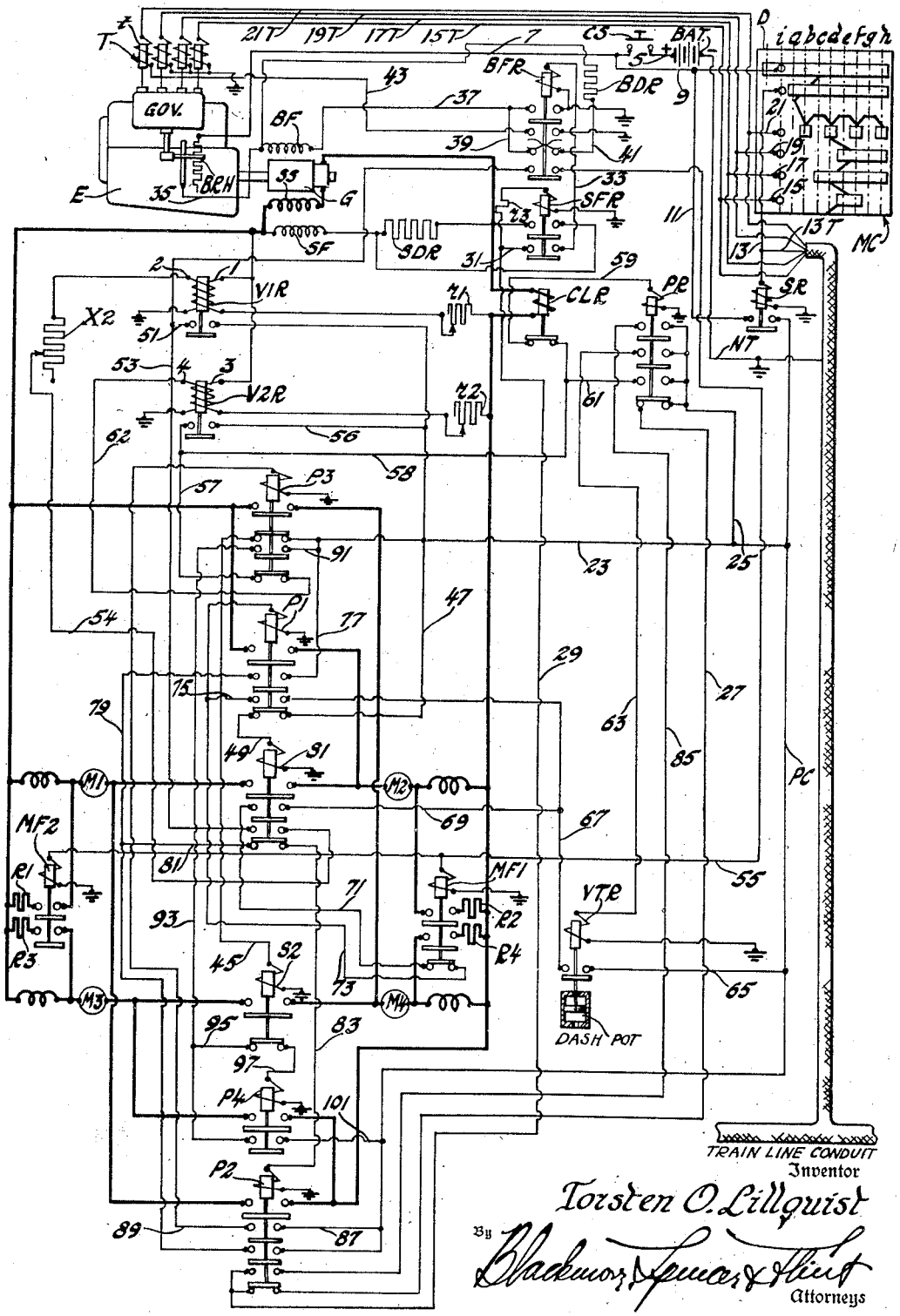

2,365,418

UNITED STATES PATENT OFFICE 2,365,418

AUTOMATIC TRANSITION CONTROL FOR GENERATING ELECTRIC TRACTOR SYSTEMS

Torsten O. Lillquist, Clarendon Hills, Ill., assignor to General Motors Corporation, Detroit, Mich., a corporation of Delaware Application September 6, 1943, Serial No. 501,403

12 Claims. (Cl. 290—17)

The present invention generally relates to generating electric traction and control systems and more particularly relates to automatic accelerating and decelerating control means for traction systems of this type.

In conventional traction systems of this type for locomotives, where the traction motor connections are changed directly from one circuit relation to another with respect to the generator of the power plant, it has been found that wide and sudden changes in voltage and current take place in the power connections which cause corresponding changes in torque and speed of both the power plant and motors. These wide and sudden changes in speed and torque of the motors cause slack run in and out between coupled locomotive units and cars pulled thereby which causes damage thereto, and in some cases a parting of the train.

The principal object of the present invention is to provide a generating electric traction and a multiple unit control system for a locomotive unit which includes electro-responsive control means for causing gradual and automatic changes in the power connections between the motors and power plant generator and for also causing automatic changes in speed load and output of the power plant upon variations in speed and load of the locomotive so that smooth acceleration and deceleration of the locomotive and efficient operation of the combined traction system is obtained.

The combined generating electric traction and control system by which the above object is accomplished, along with other novel features included therein, will be apparent by reference to the following detailed description and single accompanying drawing illustrating one form of the invention.

The drawing shows, in diagrammatic form, a generating electric traction and control system for a locomotive unit which may be operated and controlled separately or in multiple with other similar units.

The traction system comprises a Diesel Engine E, an electric generator G driven thereby and a plurality of series traction motors M1, M2, M3 and M4 for driving individual wheeled axles of the locomotive, not shown, in conventional manner.

Power connections, shown in heavy lines on the drawing, are provided between the generator and motors in which a plurality of electrically operated contactors are connected to cause gradual changes in the traction motor circuit relations with respect to the generator G. The power connections include series contactors S1 and S2, parallel contactors P1, P2, P3 and P4 and motor field shunting contactors MF1 and MF2. Each of these contactors includes an actuating winding, one or more pairs of fixed power and interlocking contacts and armature contacts which are upwardly movable from the position shown into and out of bridging relation with certain of the fixed contacts upon energization of the winding. The upper fixed pair of contacts of the series and parallel contactors are power contacts and the lower pairs of fixed contacts are interlocking contacts. Power connections are shown for connecting pairs of motors in series across the generator or each of the motors across the generator. The fixed power contacts of each of the series contactors are shown connected in a common series power connection between each pair of motors so that when these contacts are bridged, the motors are connected in a series-parallel circuit relation with the generator. The fixed power contacts of each of the parallel contactors are shown connected in shunt relation with a respective motor and the power contacts of the series contactor which are connected in series with that motor so that when the power contacts of the series contactors are opened and the power contacts of the parallel contactors are bridged the motors are connected in parallel circuit relation with the generator G. The upper two pairs of fixed contacts of each of the motor field shunting contactors MF1 and MF2 are power contacts and the lower pair of fixed contacts of the contactor MF1 are interlocking contacts. One pair of power contacts of each shunting contactor is shown connected in series with one of the motor field shunting resistors R1, R2, R3 and R4 across a respective motor field winding so that when these power contacts are simultaneously bridged with the motors connected in either series-parallel or parallel with the generator, either a series-parallel-shunt or a parallel-shunt motor circuit relation is established. The shunting of the motor field windings by the shunting resistors causes a reduction in the motor excitation current which causes an increase in the speed and torque range of the motors.

Interlocking and control connections, to be described, are shown on the drawing in lighter lines interconnecting the windings and interlocking contacts of the various contactors with control relays to cause operation of the contactors in preselected combinations and sequence whereby the traction motor circuit relations are gradually changed.

The engine and generator power plant is provided with speed load and output regulating means comprising an engine driven governor GOV, of any well known type, which acts in response to variations in engine speed, to control engine fuel varying means, not shown, and to also adjust a rheostat BRH, which is included in a battery excited generator excitation circuit, for controlling excitation of the generator in order to cause operation of power plant at substantially constant speed, load and power output in a well known manner. The governor GOV is provided with speed setting means, not shown, and a plurality of electromagnetically actuated means shown generally at T are operatively connected to the speed setting means for adjusting the speed response of the governor in order to cause operation of the power plant at idling speed and no load or at any one of a plurality of substantially constant values of speed load and output in a well known manner.

The power plant generator G is provided with a series field winding SS, a shunt excitation circuit and a battery excited excitation circuit.

The shunt excitation circuit includes a shunt field winding SF a discharge resistor SDR therefor, shown connected in series therewith, and a field control relay SFR. The relay SFR is provided with a relay winding, two pairs of fixed contacts and armature contacts moveable upwardly into bridging relation with the fixed contacts upon energization of the relay winding. The upper contacts of the relay SFR are shown connected across the discharge resistor to cause shunting, thereof, when these contacts are bridged in order to cause excitation of the field winding SF.

The battery excited generator excitation circuit includes the rheostat BRH, a generator field winding BF, a field discharge resistor BDR and a control relay BFR. The control relay BFR is provided with a relay winding, pairs of fixed contacts and a pair of armature contacts which are moveable upwardly from the position shown to cause opening of one pair of fixed contacts and the closing of the other pair of fixed contacts when the winding is energized. The fixed contacts are connected to the rheostat BRH, field winding BF, discharge resistor BDR and a battery BAT by control connections, to be described, so that the battery excited generator excitation circuit is normally disconnected from the battery and discharged and is energized only when the relay SFR is energized.

A selector relay SR is provided to control the relays SFR and BFR and the series contactors S1 and S2 in order to cause the traction motors M1 to M4 to be connected in series-parallel circuit relation with the generator G and to cause excitation of the generator or to cause the motors to be disconnected from the generator and to cause discharge of the generator field windings. The selector relay SR is provided with a relay winding, a pair of fixed contacts and an armature contact which is moveable into bridging relation with the fixed contacts upon energization of the winding.

A manually operable master controller MC, of conventional type, is provided for controlling the selector relay SR and the electromagnetically actuated means T for operating the governor speed setting means to cause starting and initial acceleration of the locomotive. The master controller MC is provided with a plurality of fixed contacts and a manually moveable drum D on which is secured a plurality of electrically interconnected contacts which are moveable into contact with the fixed contacts in the proper sequence and combination to cause smooth starting and initial acceleration of the locomotive unit. Suitable control and train line connections are shown connected to the controller, whereby the starting and initial acceleration of one or more similar locomotives may be controlled in multiple.

Electro-responsive control means comprising two voltage responsive relays V1R and V2R, and a current limit relay CLR are also shown included in the control and interlocking connections along with the control relays SR and PR and a time delay relay VTR which are controlled by these electro-responsive means. These electro-responsive means act upon preselected values of voltage and current, upon increasing and decreasing values of speed and load of the locomotive, to cause sequential operation of the various relays and contactors so that the speed, load and output of the power plant and the motor circuit relations are changed automatically in a preselected order so that smooth acceleration and deceleration of the locomotive and efficient operation of the combined locomotive traction system are obtained. As will be subsequently explained the automatic change between the series-parallel and parallel motor circuit relation takes place gradually and the power output to the motors is varied automatically during this change in circuit relations. The excitation of the traction motors is also varied automatically prior to the change in circuit relations from series-parallel to parallel in order to cause smooth acceleration and is also varied automatically subsequent to the change in circuit relations from parallel to series-parallel in order to cause smooth deceleration of the locomotive.

The voltage responsive relays V1R and V2R are each provided with a pair of fixed contacts, an armature contact and a pair of windings for controlling movement of the armature contact into and out of bridging relation with the fixed contacts. The voltage relay V1R is provided with a voltage winding 1 and a bucking winding 2 and the voltage relay V2R is provided with a voltage winding 3 and a holding winding 4. The voltage winding of the relay V1R is shown connected in series with a variable resistor r1 across the generator G and the voltage winding 3 of the relay V2R is shown connected in series with a variable resistor r2 across the generator. The bucking and holding windings of these relays are included in the control and interlocking connections, to be described. The current limit relay CLR is provided with a pair of fixed contacts, an armature contact moveable into bridging relation with the fixed contacts and a current winding which is shown connected in series between the generator and motors for moving the armature contact.

The control relay PR is provided with a plurality of pairs of fixed contacts, a plurality of pairs of armature contacts moveable into and out of contact with the fixed contacts, and a winding for moving the armature contacts upwardly from the position shown when the winding is energized.

The time delay relay VTR is provided with a pair of fixed contacts, an armature provided with a contact secured thereon and movable thereby into and out of bridging relation with the fixed contacts, a dash pot for retarding movement of the armature, and a winding for moving the armature upwardly from the position shown upon energization of the winding.

The various control, interlocking and train line connections shown in lighter lines on the drawing interconnecting the master controller MC and various relays and contactors will be described in the order in which energization and operation of the relays and contactors occur upon movement of the master controller MC from the idle control position $i$ to cause starting and initial acceleration of the locomotive.

The negative terminal of the battery is connected to a negative control and train line conductor NT which is shown entering a train line conduit. The conductor NT and all of the lower terminals of the contactor and relay windings except the voltage and current windings of the electro-responsive relays V1R, V2R and CLR are shown connected to ground in order to simplify the drawing, however, it has been found that it is desirable to connect these winding terminals directly to the conductor NT and to disconnect it from the ground where ground protective devices are used. The positive battery terminal is connected by means of a manually operable control switch CS and conductors 5, 7, 9 and 11 to one terminal of the rheostat BRH and discharge resistor BDR and also to the upper fixed contact of the master controller MC and one fixed contact of the selector relay SR. The other contact of the relay is connected to a positive control conductor PC. The upper winding terminal of the selector relay is connected by a conductor 13 to the fixed controller contact located second from the top and a train line conductor 13T is connected with the conductor 13 and is shown entering the train line conduit. Train line conductors 15T, 17T, 19T and 21T, shown extending from the train line conduit, are respectively connected to separate upper winding terminals of the electromagnetic actuating means T for the governor speed setting means. Separate conductors 15, 17, 19 and 21 are connected between each of the train line conductors 15T, 17T, 19T and 21T, and the lower fixed contacts of the master controller MC. The above mentioned train line conductors provide the means by which the electromagnetic governor speed setting means T and the windings of the selector relays SR of other similar locomotive units may be connected in multiple with the master controller MC for simultaneous control thereby in the following manner.

With the controller drum D in the idle position $i$ as shown, the windings of the electromagnetic means are deenergized and the engine is operating at idle speed and zero power output. Movement of the controller drum D to position $a$ causes the two upper fixed controller contacts to be bridged by a pair of drum contacts which causes energization of the winding of the selector relay SR through the conductors 5, 7, 9 and 13 and closure of the relay contacts which causes the positive control conductor PC to then be connected through conductors 5, 7, 9 and 11 to the positive terminal of the battery BAT.

When the master controller drum D is in control position $a$ to cause the connection of the positive control conductor PC to the positive battery terminal, simultaneous energization of the relays SFR and BFR and contactors S1 and S2 takes place through the following branch conductors connected to the positive control conductor. The upper winding terminal of the relay SFR is connected to the positive conductor PC through the normally closed lower pair of fixed interlocking contacts of the relay PR and parallel contactor P2, and through the resistor $r3$ by a positive branch conductor 23 and conductors 25, 27 and 29 which causes energization of the winding of the relay SFR and the bridging of the two pairs of fixed contacts thereof. Closure of the upper pair of contacts of the relay SFR causes the discharge resistor SDR to be shunted out of the generator shunt excitation circuit and simultaneous closure of the lower pair of control contacts causes energization of the winding of the relay BFR which is connected by conductors 31 and 33 to the conductor 29 upon closure of the lower contacts of the relay SFR. Energization of the winding of the relay BFR causes closure of the two upper and lower pairs of fixed contacts thereof and subsequent opening of the pair of contacts second from the bottom by providing a central armature contact which moves into bridging relation momentarily with both pairs of the central fixed contacts before one pair is opened. The upper pair of fixed contacts of the relay BFR are connected by conductors 5, 7, 35 and 37 in series with the rheostat BRH, the field winding BF between the positive battery terminal and ground and the fixed relay contacts second from the bottom are connected in series relation with the discharged resistor BDR across the field winding BF by conductors 39, 41 and 42 so that upon opening of these contacts and closure of the upper pair of contacts the discharge resistor circuit is opened and the rheostat BRH and the field winding BF are energized by the battery BAT. The contacts of the relay BFR second from the top are connected between ground and the lower winding terminal of the winding $t$ of the electromagnetic actuating means T of the governor speed setting means by a conductor 43 so that upon closure of these contacts a return circuit to this winding is set up which is completed upon subsequent movement of the master controller drum D between positions $b$ and $h$ which, as will be described, causes an increase in the speed, load and output of the power plant to cause starting and initial acceleration of the locomotive as the traction motors are then connected in series-parallel circuit relation with the power plant generator G. The lower winding terminals of the other electromagnetic means T are grounded. The windings of the series contactors S1 and S2 are also connected to the branch conductor 23 and are energized simultaneously with the relays SFR and BFR. The upper winding terminal of the contactor S2 is connected to the conductor 23 through the normally closed upper pair of interlocking contacts of the parallel contactor P3 and a conductor 45 to cause energization of the winding of the contactor S2 and the closure of the power contacts and the opening of the interlocking contacts thereof. Closure of the power contacts of the contactor S2 completes the common power connection between the motors M3 and M4 so that this pair of motors is then connected in series across the generator G. The upper winding terminal of the contactor S1 is also connected to the same branch conductor 23 through the normally closed lower pair of interlocking contacts of the parallel contactor P1 and conductors 47 and 49 to cause energization of the winding of the contactor S1 and closure of the power contacts and upper two pairs of interlocking contacts and the opening of the lower pair of interlocking contacts thereof. Closure of the power contacts of the contactor S1 completes a common power connection between the motors M1 and M2 so that this pair is also connected in series across the generator G and both pairs of motors are accordingly simultaneously connected in series-parallel circuit relation with the generator through the power connections described.

Movement of the drum D of the master controller MC successively from control position $b$ to position $h$ by reason of the drum contact arrangement shown and conductors 15, 15T, 17, 17T, 19, 19T, 21 and 21T shown connected respectively between lower fixed controller contacts and the upper winding terminals of the electromagnetic means T causes energization of these windings separately and in combination to cause an increase in the speed, load and output of the power plant between the minimum and maximum values. Energization of the winding $t$ of the electromagnetic means T takes place through the conductor 21 and 21T and the above described return circuit including the conductor 41 which is completed by closure of the contacts of the relay BFR, second from the top. The electromagnetic means T is operably connected to the governor speed setting means in suitable manner so that when the winding $t$ of this means is automatically deenergized by deenergization of the winding of the relay BFR by operation of the electro-responsive means V2R and CLR, the power plant is caused to operate at a preselected value of speed, load and output between the minimum and maximum values whereby smooth transition of the motor connections occur. It will be evident that the train line conductors 13T, 15T, 17T, 19T, 21T and negative control and train line conductor NT may be connected in multiple with similar train line conductors provided on other similar locomotive units to cause starting and initial acceleration of all of the interconnected units in like manner to that described above.

The automatic and gradual change in the motor circuit relations and control of the speed, load and output of the power plant of each locomotive upon a change in speed and load is controlled by action of the electro-responsive relay V1R, V2R and CLR upon variation in speed and load of each locomotive. The values of speed at which these circuit changes take place are for a preselected driving gear ratio between the motors and wheels and a given size wheel. The control and interlocking connections whereby this is accomplished will now be described.

The initial increase in speed of the locomotive unit up to a value of speed of 20 miles per hour by the series traction motors, when connected in series-parallel relation, causes an increase in the C. E. M. F. of the motors and the generator voltage to a value whereby sufficient pull is exerted by the voltage winding 1 of the voltage relay V1R to cause closure of its contacts. The contacts of the voltage relay V1R are connected in series with the lower pair of contacts of the relay BFR between the positive control conductor PC and upper winding terminals of both of the motor field shunting contactors MF1 and MF2 by conductors 23, 47, 51, 53 and 55 which causes energization of each of these contactor windings as the contacts of relay V1R and BFR are now closed. Energization of the windings of both of the contactors MF1 and MF2 causes closure of both pairs of power contacts thereof and the opening of the interlocking contacts of the contactor MF1. Closure of the power contacts of the shunting contactors causes the shunting of each of the motor series field winding by one of the shunting resistors R1 to R4 which establishes the series-parallel-shunt motor circuit relation. It will be noted here that the interlocking contacts of the series contactor S1 are connected in series with the adjustable resistor $x2$ and the bucking winding 2 of the voltage relay V1R by the conductors 53 and 54 so that the energization of this relay bucking winding takes place upon closure of the contacts of this relay.

Upon establishment of the series-parallel-shunt motor circuit relation the motor excitation is reduced which causes a reduction in the C. E. M. F. of the motors and a reduction in the generator voltage and an increase in the current supplied to the motors to cause them to exert increased driving torque and thereby cause further acceleration in the locomotive. This reduction in voltage of the generator is, however, not sufficient to cause opening of the contacts of the relay V1R, due to the reduction of the pull exerted by the voltage winding thereof.

Further acceleration of the locomotive up to a speed of 31 miles per hour causes an increase in the C. E. M. F. of the motors and generator voltage to a value at which sufficient pull is exerted by the voltage winding of the other voltage relay V2R to cause closure of the contacts thereof which causes a sudden momentary reduction in the speed, load and output of the power plant, a momentary decrease in the motor excitation and sequential energization of the parallel contactors windings and sequential deenergization of the series contactors to cause a gradual and automatic change in the motor connections from the series-parallel-shunt to the parallel motor circuit relation. The control and interlocking connections for causing these changes are as follows:

The contacts of the voltage relay V2R are connected between the positive control conductor PC and the upper winding terminal of the relay PR through the normally closed contacts of the current limit relay CLR by conductors 23, 47, 56, 57, 58 and 59 so that energization of the winding of the relay PR takes place upon closure of the contacts of the voltage relay V2R. Energization of the winding of the relay PR causes the opening of the lower pair of contacts and closure of the three upper pairs of contacts thereof. Opening of the lower pair of contacts of the relay opens the energizing connection to the winding of the relay SFR comprising conductors 25, 27 and 29 through the lower interlocking contacts of the contactor P2 which causes the opening of both pairs of contacts of the relay SFR. Opening of the upper pair of contacts of the relay SFR inserts the discharge resistor SDR in series with the generator shunt field winding SF and the opening of the lower pair of relay contacts causes deenergization of the winding of the relay BFR which causes the armature contacts to drop to the position shown. When the armature of the relay BFR drops to this position, the battery excited generator field winding BF and rheostat BRH are disconnected from the battery BAT and the battery field BF is connected in closed series circuit relation with the discharge resistor BDR, the above described return circuit for the winding of the winding $t$ of the electromagnetic means T is opened and this winding is deenergized to reduce the speed, load and output of the power plant to a preselected value between the minimum and maximum values and the energizing connection to the motor field shunting contactor windings is opened to cause an increase in the excitation and C. E. M. F. of the motors. It will be apparent that the above described changes cause a prompt and drastic reduction in the speed, load and output of the power plant and voltage of the generator G which would ordinarily cause reopening of the contacts of the voltage relays V1R and V2R. In order to prevent opening of the contacts of the relay V2R the holding winding 4, thereof, is connected in a holding circuit which is connected to the positive control conductor PC. This holding circuit comprises the closed lower interlocking contacts of the contactors P3, the now closed contacts of the relay PR, second from the bottom, and conductors 25, 61, 58, 57 and 62. The winding of the relay PR is also included in this holding circuit through the closed contacts of the current relay CLR which are connected between the conductor 58 and the conductor 59, the latter of which is also connected to the winding of the relay PR. Closure of the contacts, second from the top of the relay PR, which are connected by a conductor 63 between the conductor 25 and the winding of the time delay relay VT, causes energization of this winding but the contacts are delayed in closing by the dash pot which retards upward movement of the relay armature until the speed, load and output of the power plant is reduced to a lower value suitable for causing an automatic and gradual change in the motor connections from the series-parallel to the parallel circuit connection in the following manner:

The contacts of the relay VTR are connected between the positive control conductor PC and the winding of the parallel contactor P1 through the closed upper interlocking contacts of the series contactor S1 and the now closed interlocking contacts of the motor field shunting contactor MF1 by the conductors 65, 67, 69, 71 and 73 to cause energization of the winding of the parallel contactor P1 when the contacts of the time delay relay VTR close.

Energization of the winding of the parallel contactor P1 causes closure of the power contacts and the upper two pairs of interlocking contacts and the opening of the lower pair. Closure of the power contacts of the contactor P1, which are shown connected by power connections between one terminal of the motor M1 and the common series power connections, including the closed power contacts of the contactor S1, between the motors M1 and M2 causes the motor M1 to be shunted and the motor M2 to be connected across the generator G or in parallel therewith. Closure of the central interlocking contacts of the contactor P1, which are connected by the conductors 67 and 75 to the conductor 73, completes a second holding circuit to the contactor winding. Closure of the upper interlocking contacts of the contactor P1 sets up an energizing circuit to the winding of the contactor P2 which includes these closed contacts and the open lower interlocking contacts of the contactor S1 and conductors PC, 23, 77, 79, 81 and 83. Opening of the lower interlocking contacts of the parallel contactor P1 opens the energizing connection, comprising the conductors 47 and 49, to the winding of the contactor S1 to cause opening of the power contacts and upper two pairs of interlocking contacts and closure of the lower pair thereof. Opening of the power contacts of the series contactor S1 breaks the common series power connection between the motors M1 and M2 to disconnect the shunted motor M1 from the generator and leaves the motor M2 connected across or in parallel with the generator. Opening of the upper pair of interlocking contacts of the series contactor S1 opens one of the completed holding circuits to the winding of the contactor P1 through these contacts and the closed interlocking contacts of the contactor MF1. Opening of the interlocking contacts, second from the bottom of the contactor S1, opens the previously mentioned energizing circuit to the bucking winding of the voltage relay V1R and the closing of the lower interlocking contacts of the contactor S1 completes the energizing circuit to the winding of the contactor P2 set up by closure of the upper interlocking contacts of the contactor P1 comprising the conductors PC, 23, 77, 79, 81 and 83. Energization of the winding of the contactor P2 causes closure of the power contacts and the upper three pairs of interlocking contacts and the opening of the lower pair of contacts thereof.

Closure of the power contacts of the contactor P2 causes the motor M1 to then be connected across the generator G so that each of the motors M1 and M2 are now connected across the generator, or in parallel therewith. The motors M3 and M4 at this time are still connected in series across the generator. Closure of the interlocking contacts, third from the bottom, of the contactor P2 completes a holding circuit to the winding of the contactor P2 as these contacts are connected in series with the closed lower interlocking contacts of the contactor S1 between the positive control conductor PC and this winding by the conductors 79, 81 and 83. Closure of the interlocking contacts, second from the bottom of the contactor P2, which are connected in series with the upper closed contacts of the relay PR between the conductors 25 and 29 by means of a conductor 85 causes reenergization of the windings of the relays SFR and BFR which act in the previously described manner to cause reexcitation of the generator and winding of the electromagnetic means T so that the speed, load and output of the power plant is automatically increased to its original value. Closure of the upper interlocking contacts of the contactor P2, which are connected in series between the positive control conductor PC and the winding of the contactor P3 by conductors 87 and 89, causes energization of this winding and closure of the power contacts and central interlocking contacts and the opening of the upper and lower interlocking contacts of the contactor P3.

Closure of the power contacts of the contactor P3, which are shown connected by power conductors between one terminal of the motor M3 and the common series power connection, including the closed power contacts of the series contactor S2, causes the motor M3 to be shunted and the motor M4 to be connected across the generator G or in parallel therewith. Closure of the central pair of interlocking contacts of the contactor P3, which are connected in series with the open interlocking contacts of the series contactor S2 and the winding of the contactor P4 by conductors PC, 23, 77, 91, 93, 95 and 97, sets up an energizing connection to the winding of the contactor P4. Opening of the lower pair of interlocking contacts of the contactor P3 breaks the holding circuit to the holding winding 4 of the voltage relay V2R and the opening of the upper pair of contacts of the contactor P3 breaks the energizing connection, comprising the conductors 23 and 45, to the winding of the series contactor S2, which causes the opening of the power and interlocking contacts thereof.

Opening of the power contacts of the contactor S2 opens the shunt connection of the motor M3 and disconnects the motor from the generator G leaving the motor M4 connected across the generator so that the motors M1, M2 and M3 are now connected in parallel with the generator. The closing of the interlocking contacts of the contactor S2 completes the previously mentioned energizing connection, set up by closure of the central pair of contacts of the contactor P3, to the winding of the contactor P4, which causes energization of this winding and closure of the power and interlocking contacts of the contactor P4.

Closure of the power contacts of the contactor P4 causes the motor M3 to be then connected across the generator or in parallel therewith and closure of the interlocking contacts of the contactor P4 which are connected between the conductors PC and 93 by a conductor 101, completes a holding circuit to the winding of the contactor P4.

With all of the motors now connected across the generator G the locomotive speed will be further increased, and when it is accelerated to a speed of 53 miles per hour, the voltage applied to the voltage winding of the relay VIR is again sufficient to cause reclosure of the relay contacts. This causes reenergization of the windings and closure of the power contacts of the motor field shunting contactors MF1 and MF2 through the previously described energizing connections to cause the establishment of the parallel-shunt motor circuit relation.

With the motors connected in parallel-shunt circuit relation with the generator G the motor excitation will be again reduced to cause a corresponding reduction in the C. E. M. F. of the motors and generator voltage, which causes an increase in the current supplied to the motors which causes further increase in the torque, and speed thereof and further acceleration of the locomotive to its maximum speed.

Upon an increase in load on the locomotive the speed will decrease which causes an increase in the current and a decrease in the generator voltage. When the generator voltage decreases to a value corresponding to a speed of 50 miles per hour the pull exerted by the voltage winding 1 of the voltage relay VIR will be insufficient to keep the relay contacts closed and they will open to cause deenergization of the windings of the motor field shunting contactors and the opening of the power contacts thereof and closure of the interlocking contacts of the contactor MF1. The motor circuit relations will accordingly be changed from the parallel-shunt back to the straight parallel circuit relation.

With the motors connected in parallel circuit relation upon an increase in load thereon, the current will rise and when it reaches a value corresponding to a speed of 25 miles per hour of the locomotive, sufficient pull is exerted by the winding of the current relay CLR to cause the opening of the contacts of the current limit relay which causes a gradual change from the parallel circuit relation to the series-parallel-shunt circuit relation in the following manner:

Opening of the contacts of the current limit relay CLR opens the holding circuit to the winding of the relay PR from the positive control conductor PC through the closed contacts of the relay PR, second from the bottom and the conductors 25, 61, 58 and 59, which causes the opening of the upper three pairs of contacts and closure of the lower pair of contacts of the relay PR.

Opening of the upper contacts of the relay PR opens the energizing connection, which includes these contacts, the closed contacts, second from the bottom of the contactor P2 and conductors PC, 25, 85, 29 and the resistor r3 to the winding of the relay SFR to cause reopening of the contacts thereof, which again causes a sudden reduction in the speed, load and output of the power plant in the same manner as previously described. Opening of the contacts, second from the top of the relay PR opens the energizing connection including the conductors 25 and 63 to the winding of the time delay relay, which causes delayed opening of the contacts thereof by reason of the dash pot provided on this relay.

When the contacts of the time delay relay open, the holding circuit to the winding of the contactor P1 is also opened, to cause the opening of the power contacts and closure of the lower interlocking contacts thereof. This holding circuit includes the contacts of the time delay relay VTR, the closed interlocking contacts of the contactor P1, second from the bottom and conductors PC, 65, 67, 75 and 73.

Opening of the power contacts of contactor P1 disconnects the motor M2 from the generator G and closure of the lower interlocking contacts of the contactor P1 causes reenergization of the winding of the series contactor S1 to cause reclosure of the power contacts and upper two pairs of interlocking contacts and the opening of the lower pair of contacts thereof.

Closure of the power contacts of the contactor S1 completes the common series power connection between the motors M1 and M2 and as the motor M1 is still connected directly across the generator G through the closed power contacts of the contactor P2, which are connected between this common power connection and the opposite terminal of the motor M2, the motors M1 and M2 are then connected in series across the generator with the motor M2 shunted. Opening of the lower pair of interlocking contacts of the series contactor S1 opens the energizing connection to the winding of the contactor P2 which causes the opening of the power contacts and upper three pairs of interlocking contacts and closure of the lower pair of interlocking contacts thereof.

Opening of the power contacts of the contactor P2 opens the shunt connection of the motor M2 to cause the motors M1 and M2 to then be connected in series across the generator. The motors M3 and M4 are still connected in parallel with the generator at this time. Closure of the lower interlocking contacts of the parallel contactor P2 again completes the energizing connection through these contacts and the closed lower contacts of the relay PR and conductors PC, 23, 25, 27 and 29 to the winding of the relay SFR to cause reclosure of its contacts and energization and closure of the relay BFR which again causes an increase in the speed, load and output of the generator to its original value. Opening of the upper interlocking contacts of the contactor P2 opens the energizing connection comprising conductors PC, 87 and 89 to the winding of the contactor P3 which causes the opening of the power contacts and central pair of interlocking contacts and the closure of the upper and lower pair of interlocking contacts thereof.

Opening of the power contacts of the contactor P3 disconnects the motor M4 from the generator G and closure of the upper interlocking contacts of the contactor P3 reestablishes the energizing connection to the winding of the series contactor S2 comprising these contacts and conductors 23 and 45 to cause reclosure of the power contacts and the opening of the interlocking contacts of the contactor S2.

Closure of the power contacts of the series contactor S2 establishes the common series power connection between the motors M3 and M4 and as the motor M3 is still connected across the generator G through the closed power contacts of the contactor P4, which are connected between the common connection between the motors M3 and M4 and the opposite terminal of the motor M4, the motors M3 and M4 are then connected in series across the generator with the motor M4 shunted. Opening of the interlocking contacts of the contactor S2 opens the holding circuit to the winding of the contactor P4 comprising the closed lower interlocking contacts of the contactor P4 and conductors PC, 101, 95, and 97 to cause the opening of the power and interlocking contacts of the contactor P4.

Opening of the power contacts of the contactor P4 opens the shunt connection of the motor M4 causing the motors M3 and M4 to be then connected in series across the generator. The motors M1 and M2 at this time are also connected in series across the generator and the voltage applied to the voltage winding 1 of the voltage relay VIR is then sufficient to cause closure of the relay contacts which causes energization and reclosure of the motor field shunting contactors MF1 and MF2 through the closed contacts of the relay VIR and the closed lower contacts of the relay BFR and conductors PC, 23, 47, 51, 53 and 55, thereby causing reestablishment of the series-parallel-shunt motor circuit relation. The circuit to bucking winding 2 of the voltage relay VIR is also completed through the closed interlocking contacts, second from the bottom, of the contactor S1, and conductors 53 and 54 upon closure of the contacts of the relay VIR.

With the motors connected in series-parallel-shunt circuit relation with the generator G, upon a further decrease in the speed due to an increase in load on the locomotive, the voltage of the generator will decrease. When the speed of the locomotive decreases to 19 miles per hour the combined action of the voltage winding 1 and bucking winding 2 of the voltage relay VIR causes the opening of the relay contacts which causes deenergization of the windings and opening of the power contacts of the motor field shunting contactors. When this occurs the motors are again connected in straight series-parallel circuit relation with the generator.

With the motors in series-parallel circuit relation if it is desired to disconnect them from the generator the drum of the master controller is moved back to the idle position $i$. This causes deenergization of the windings of the electromagnetically actuated governor speed setting means T of the power plant to cause it to operate at idling speed and also causes deenergization of the winding of the selector relay SR and the opening of the contacts thereof, which causes deenergization of the windings of the relays SFR and BFR and the windings of the series contactors S1 and S2 thereby causing discharge of the shunt and battery excited generator excitation circuits and opening of the power contacts of the series contactors to disconnect the traction motors from the generator.

It will be evident that the above described generating electric traction and control system for a locomotive unit permits starting and initial acceleration thereof by movement of the master controller and the electro-responsive control means then acts automatically in response to variations in speed and loads of the locomotive to cause variations in the speed, load and output of the power plant and gradual changes in the traction motor circuit relations so that smooth acceleration and deceleration of the locomotive unit takes place. The train line connections provided, permit a plurality of similar locomotive units to be controlled and operated in multiple.

I claim:

1. A traction and control system comprising a plurality of traction motors, excitation control means therefor, a power plant for said motors, output control means for the power plant, power connections including switching means between the motors and power plant, certain of said switching means being operable to connect each motor across said power plant, certain other said switching means being operable to connect separate groups of said motors in series across said power plant, interlocking and control connections between said excitation controlling means, said output reducing means and said switching means to cause combined and sequential operation of said switching means whereby a reduction in the power plant output occurs while the motor connections are transferred one at a time between the separate and group connection and the motor excitation is reduced prior to and after transfer of the motor connections, and electro-responsive control means adapted to act in response to variations in electrical conditions in the motor power connections upon variations in speed and load of the motors to control combined and sequential operation of said switching means.

2. A traction and control system comprising a plurality of traction motors, excitation controlling means therefor, a power plant for said motors, output controlling means for said power plant, power connections including a plurality of switching means between the motors and power plant, certain of said switching means being operable to cause each of said motors to be connected in parallel with said power plant and certain other of said switching means being arranged between separate motors of separate groups of motors to operate and cause the motors of each group to be connected in series across said power plant, interlocking and control connections interconnecting said switching means, said motor excitation controlling means and said power plant output controlling means whereby the output of the power plant is reduced while the motor connections are transferred one at a time between separate parallel connection and series group connection of the motors by shunting of another motor and the motor excitation is reduced before and after transfer of the motor connections and control means for said switching means adapted to act in response to variations in electrical conditions in said motor power connections to cause combined and sequential operation of said switching means.

3. A traction and control system comprising a plurality of traction motors, a power plant for said motors, motor field shunting means, speed, load and output regulating means for said power plant, motor power connections including a plurality of switching means, interlocking and control connections between said switching means, said motor field shunting means and said power plant regulating means for causing combined and sequential operation of said switching means, operation of said switching means in this manner causing a momentary reduction in said speed, load and output of said power plant and a gradual change in the power connections and a reduction in the motor excitation before and after said gradual change in the connections whereby smooth acceleration and deceleration of said motors is obtained, and electrical control means acting automatically in response to electrical variations in said power connections upon variations in the speed and load of said motors for controlling operation of said switching means.

4. A traction and control system for a locomotive comprising a plurality of traction motors for driving the axles of said locomotive, motor excitation varying means, a power plant for said motors including an engine and an electric generator driven thereby; speed, load and output regulating means for said power plant, motor power connections including a plurality of connection changing means, interlocking and control connections between said motor excitation varying means, said power plant regulating means and said switchig means, said interlocking and control connections including control relays and control means for said relays, said control means including a manually operable controller for controlling certain said relays to cause an increase in the speed, load and output of said power plant and to cause said motors to be connected in starting power circuit relation with said generator, and automatic control means acting in response to preselected electrical variations in said motor connections for controlling said relays to cause a momentary reduction in output of said power plant and a gradual change between said motor starting circuit relation and a running circuit relation, and for causing operation of said motor excitation varying means prior to and after said gradual change in said motor circuit relations in order to cause smooth acceleration and deceleration of said locomotive upon changes in the speed and load thereon.

5. A traction and control system for a locomotive comprising a plurality of traction motors, field shunting means therefor, a power plant for said motors including an engine and an electric generator driven thereby, speed, load and output regulating means for said power plant, motor power connections including a plurality of connection changing means, interlocking and control connections including a plurality of control relays interconnecting said motor field shunting means, said power plant regulating means, and said switching means, a manually operable master controller for controlling certain of said relays to cause an increase in the speed, load and output of said power plant and to cause said motors to be connected in a starting circuit relation with said generator thereby to cause starting and initial acceleration of said locomotive, train line connections connected to said master controller adapted to be connected in multiple with similar control relays on other locomotives to cause starting thereof, and automatic control means for controlling said relays to cause a momentary reduction in the speed, load and output of said power plant and gradual changes between motor starting and running circuit relations and to control operation of said motor field shunting means prior to and after said gradual changes in said motor circuit relations, said automatic control means acting in response to voltage and current variations in said motor circuit relations upon variation in speed and load of said motors.

6. A traction and control system for a locomotive comprising a plurality of electric traction motors, a power plant including an engine and an electric generator for supplying power to said motors; speed, load and output regulating means for said power plant, motor power connections including a plurality of series, parallel and motor field shunting contactors, interlocking and control connections between said power plant regulating means and said contactors, said interlocking and control connections including a plurality of control relays, and manually operable and automatic control means for said relays whereby operation of said manually operable means causes said motors to be connected in series-parallel circuit relation with said generator and also causes an increase in the speed, load and output of said power plant to cause starting of said locomotive, said automatic means comprising generator voltage and current responsive means and time delay means interconnected between said motor power connections and said interlocking and control connections whereby said automatic means acts upon electrical variations in said motor power circuits to cause proper combined and sequential operation of said control relays and contactors so that said motor connections are automatically changed between series-parallel series-parallel-shunt, parallel and parallel-shunt circuit relations with said generator and a gradual change between the series-parallel and parallel circuit relations occurs accompanied by a momentary reduction in speed, load and output of said power plant.

7. An electric traction and control system comprising a plurality of traction motors, a source of power therefor, motor power connections including a plurality of switching means, certain of said switching means being individually operable to connect separate groups of said motors in series across said power source and certain other of said switching means being individually operable for connecting individual motors of each group across said power source, interlocking and control connections including control means interconnected with all of said switching means to cause combined and sequential operation thereof whereby the power connections of each group of motors are changed consecutively, and the individual motors of each group are connected one at a time across the power source or in series with the motors of a group, said control means being responsive to variable electrical conditions in said motor power connections upon a change in the speed and load of said motors.

8. An electric traction and control system comprising a plurality of traction motors, a source of power for said motors, output regulating means for said power source, motor power connections including a plurality of switching means, interlocking and control connections between said switching means and said output regulating means, said interlocking and control connections also including control means for causing combined and sequential operation of said switching and output regulating means whereby individual motors of separate groups of motors are connected one at a time across said power source or are connected one at a time in series with the motors of a respective group across said power source and the power output of said power source is regulated during said changes in said motor connections to cause smooth acceleration or deceleration of said motors, said control means including electrical means acting in response to variations in voltage and current in said motor power connections upon a change in speed and load of said motors.

9. An electric traction and control system comprising a plurality of traction motors, field shunting means therefor, a power plant supplying power to said motors, motor power connections including a plurality of switching means for changing the motor connections and operating said field shunting means, interlocking and control connections between said motor field shunting means and said switching means, said interlocking and control connections including control means for causing combined and sequential operation of said switching means whereby individual motors of separate groups of motors are connected one at a time across said power source or are connected one at a time in series with the motors of a respective group across said source and said motor fields are shunted prior to and after said changes in said motor connections to cause smooth acceleration or deceleration of said motors, said control means including electrical means acting automatically in response to variable electrical conditions in said motor connections upon variations in the speed and load of said motors.

10. An electric traction and control system comprising a plurality of traction motors, a source of power therefor, motor power connections including a plurality of switching means, said switching means being connected in said connections in such manner so that upon operation of certain of said switching means separate groups of said motors are connected in series across said source and upon operation of certain other of said switching means individual motors of each group are connected across said power source, interlocking and control connections including control means interconnected with all of said switching means to cause combined and sequential operation of said switching means whereby the power connections of each group of motors are changed consecutively and the individual motors of each group are connected one at a time across said power circuit or in series with the motors of a group, certain motors of each group being shunted prior to connection across said source or in series with the motors of a group, said control means for said switching means being operable automatically in response to preselected variations in electrical conditions in said motor power connections upon changes in the speed and load of said motors.

11. An electric traction and control system comprising a plurality of traction motors, field shunting means therefor, a power plant supplying power to said motors, output regulating means for said power plant, motor power connections including a plurality of switching means, interlocking and control connections between said motor field shunting means, said power plant output regulating means and said switching means, said control and interlocking connections including control means for causing combined and sequential operation of said switching means whereby individual motors of separate groups of motors are connected one at a time across said power source or are connected one at a time in series with a respective motor group across said source by shunting of certain of said motors of each group and said power output of said power source is regulated during said change in said motor connections and said motor fields are shunted prior to and after said change in said motor connections to cause smooth acceleration and deceleration of said motors, said control means including time delay means, control relays and means acting automatically in response to preselected values of voltage and current in said power connections corresponding to increasing and decreasing values of motor speed and load.

12. An electric traction and control system for a locomotive comprising a power plant including an engine and an electric generator driven thereby, means for regulating the speed, load and output of said power plant, a plurality of electric traction motors for driving the locomotive wheels, power connections between said generator and motors including series, parallel and motor field shunting contacts, control and interlocking connections between said power plant regulating means and said contactors including control relays, a time delay relay, automatic control means acting in response to changes in the generator voltage and current, and manually operable master controller whereby operation of said controller causes operation of certain relays and said series contactors and said power plant regulating means to cause pairs of said traction motors to be connected in series across said generator and an increase in the speed, load and output of said power plant to cause starting of the locomotive, thereby rendering said automatic control means responsive to control operation of said relays and time delay relay to cause combined and sequential operation of said power plant regulating means and series, parallel and shunting contactors whereby the speed, load and output of the power plant is regulated and the motor power connections are automatically changed successively between series-parallel, series-parallel-shunt, parallel and parallel-shunt circuit relations with respect to said generator for increasing values of generator voltage and locomotive speed or said motor circuit relations are automatically changed in reverse order to that mentioned for increasing values of generator current and load on said locomotive, said change between the series-parallel-shunt and parallel motor circuits taking place gradually by successively causing reduction in the speed, load and output of the power plant and establishment of the series-parallel motor connection, the connecting of one pair of series connected motors one at a time in parallel with the generator, an increase in the speed, load and output of the power plant to the original value, the shunting of one motor of another series connected pairs and the connection of one motor at a time of this pair of motors in parallel with said generator, said change in connections between the parallel and series-parallel-shunt also taking place gradually by successively causing a reduction in the speed, load and output of said power plant the shunting of one motor of a pair of parallel connected motors, the connection of both motors of said pair in series across said generator, an increase in the speed, load and output of said power plant to the original value, the shunting of one motor of another pair of parallel connected motors, the connection of both motors of said pair in series across said generator and the establishment of said series-parallel-shunt circuit relation.

TORSTEN O. LILLQUIST.